(12) United States Patent
Ji et al.

(10) Patent No.: US 9,970,511 B2
(45) Date of Patent: May 15, 2018

(54) PLANETARY GEAR TRAIN OF AUTOMATIC TRANSMISSION FOR VEHICLES

(71) Applicant: Hyundai Motor Company, Seoul (KR)

(72) Inventors: Seongwook Ji, Gyeonggi-do (KR); Seong Wook Hwang, Gyeonggi-do (KR); Hyun Sik Kwon, Seoul (KR); Wonmin Cho, Gyeonggi-do (KR); Jae Chang Kook, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/211,718

(22) Filed: Jul. 15, 2016

(65) Prior Publication Data
US 2017/0268604 A1    Sep. 21, 2017

(30) Foreign Application Priority Data
Mar. 16, 2016 (KR) .......................... 10-2016-0031475

(51) Int. Cl.
*F16H 3/66* (2006.01)
(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | |
|---|---|---|---|
| 8,083,630 B2 * | 12/2011 | Rice | F16H 3/66 475/280 |
| 8,096,915 B2 | 1/2012 | Wittkopp et al. | |
| 2015/0133259 A1* | 5/2015 | Nakamura | F16H 3/66 475/275 |

FOREIGN PATENT DOCUMENTS

| | | |
|---|---|---|
| JP | 2015-064084 A | 4/2015 |
| JP | 2015-064099 A | 4/2015 |
| KR | 10-2013-0077146 A | 7/2013 |

\* cited by examiner

*Primary Examiner* — Erin D Bishop
(74) *Attorney, Agent, or Firm* — Mintz Levin Cohn Ferris Glovsky and Popeo, P.C.; Peter F. Corless

(57) ABSTRACT

A planetary gear train of an automatic transmission for a vehicle is provided that realizes at least ten forward speeds to improve power delivery performance and fuel consumption due to multi-stages. In particular, the planetary gear train includes an input shaft, an output shaft, four planetary gear sets respectively having three rotational elements, and six control elements for selectively interconnecting the rotational elements and a transmission housing.

8 Claims, 2 Drawing Sheets

FIG. 2

| Shift-stage | Control element | | | | | | Gear ratio |
|---|---|---|---|---|---|---|---|
| | C1 | C2 | C3 | C4 | B1 | B2 | |
| D1 | ● | ● | | | | ● | 4.400 |
| D2 | | ● | | | ● | ● | 2.640 |
| D3 | ● | | | | ● | ● | 2.112 |
| D4 | | | | ● | ● | ● | 1.800 |
| D5 | ● | | | ● | ● | | 1.500 |
| D6 | | ● | | ● | ● | | 1.258 |
| D7 | | ● | ● | ● | | | 1.000 |
| D8 | | | ● | ● | ● | | 0.771 |
| D9 | | ● | ● | | ● | | 0.600 |
| D10 | ● | | ● | | ● | | 0.568 |
| REV | ● | | ● | | | ● | 7.040 |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2016-0031475 filed in the Korean Intellectual Property Office on Mar. 16, 2016, the entire contents of which are incorporated herein by reference.

BACKGROUND (a) Field of the Invention

The present invention relates to an automatic transmission for a vehicle, and more particularly, to a planetary gear train of an automatic transmission for a vehicle that realizes, by minimal complexity, at least ten forward speeds, thereby improving power delivery performance and fuel consumption due to multi-stages, and improving driving stability of a vehicle by utilizing a low rotation speed of an engine.

(b) Description of the Related Art

Generally, in the automatic transmission field, achieving more shift stages is a technology for maximizing fuel consumption and driving efficiency and has been researched, and recent increases in oil prices are triggering competition in enhancing fuel consumption of a vehicle. In particular, research on an engine has been conducted to achieve weight reduction and to enhance fuel consumption by downsizing, and research on an automatic transmission has been performed to simultaneously provide improved drivability and fuel consumption by achieving more shift stages.

In particular, to achieve more shift stages for an automatic transmission, the number of parts, particularly the number of planetary gear sets is typically increased and installability, production cost, weight, and/or power flow efficiency based on total length of transmission increases. Therefore, to maximally enhance fuel consumption of an automatic transmission having more shift stages, it is important for better efficiency to be derived by a smaller number of parts.

Accordingly, an eight-speed automatic transmission has recently been introduced, and a planetary gear train for an automatic transmission enabling more shift stages is continuously required. However, the majority of general automatic transmissions having more than eight speeds include three to four planetary gear sets and five to six control elements (friction element), in this case, total length is increased, which has drawbacks of deteriorating installability. As a result, plural rows structure in which planetary gear sets are on planetary gear sets has been adopted, or a dog clutch has been applied in place of wet control elements. However, in this case, applicable structure is restricted and shift feel is deteriorated by applying the dog clutch.

The above information disclosed in this section is merely for enhancement of understanding of the background of the invention and therefore it may contain information that does not form the prior art that is already known in this country to a person of ordinary skill in the art.

SUMMARY

The present invention provides a planetary gear train of an automatic transmission for a vehicle having advantages of obtaining shift-stages of at least the forward ten speeds and at least one reverse speed by a minimal number of parts, improving power delivery performance and fuel consumption by multi-stages of an automatic transmission, and improving driving stability of a vehicle by utilizing a low rotation speed of an engine.

A planetary gear train according to an exemplary embodiment of the present invention may include an input shaft for receiving an engine torque; an output shaft for outputting a shifted torque; a first planetary gear set having first, second, and third rotational elements; a second planetary gear set having fourth, fifth, and sixth rotational elements; a third planetary gear set having seventh, eighth, and ninth rotational elements; a fourth planetary gear set having tenth, eleventh, and twelfth rotational elements; a first shaft connected with the first rotational element; a second shaft that interconnects the second rotational element and the fourth rotational element and directly connected with the input shaft; a third shaft connected with the third rotational element; a fourth shaft connected with the fifth rotational element and selectively connected with the third shaft; a fifth shaft that interconnects the sixth rotational element and the ninth rotational element and selectively connected with the third shaft; a sixth shaft that interconnects the seventh rotational element and the eleventh rotational element and directly connected with the output shaft; a seventh shaft that interconnects the eighth rotational element and the tenth rotational element and selectively connected with the fourth shaft; and an eighth shaft connected with the twelfth rotational element and selectively connected with the third shaft.

The first and eighth shafts may be selectively connected with the transmission housing respectively. The first, second, and third rotational elements of the first planetary gear set may be respectively a first sun gear, a first planet carrier, and a first ring gear of the first planetary gear set. The fourth, fifth, and sixth rotational elements of the second planetary gear set may be respectively a second sun gear, a second planet carrier, and a second ring gear of the second planetary gear set. The seventh, eighth, and ninth rotational elements of the third planetary gear set may be respectively a third sun gear, a third planet carrier, and a third ring gear of the third planetary gear set. The tenth, eleventh, and twelfth rotational elements of the fourth planetary gear set may be respectively a fourth sun gear, a fourth planet carrier, and a fourth ring gear of the fourth planetary gear set.

A planetary gear train according to an exemplary embodiment of the present invention may further include a first clutch that selectively connects the third shaft and the fourth shaft; a second clutch that selectively connects the third shaft and the fifth shaft; a third clutch that selectively connects the third shaft and the eighth shaft; a fourth clutch that selectively connects the fourth shaft and the seventh shaft; a first brake that selectively connects the first shaft and the transmission housing; and a second brake that selectively connects the eighth shaft and the transmission housing.

According to an exemplary embodiment of the present invention, shift-stages of at least forward ten speeds and at least one reverse speed may be realized by a combination of four planetary gear sets of simple planetary gear sets and six control elements. In addition, a planetary gear train according to an exemplary embodiment of the present invention may realize shift stages appropriate for rotation speed of an engine due to multi-stages of an automatic transmission and improve driving stability of a vehicle by utilizing a low rotation speed of an engine. The planetary gear train according to an exemplary embodiment of the present invention maximizes engine driving efficiency by multi-stages of an automatic transmission, and may improve power delivery performance and fuel consumption.

Further, effects that may be obtained or expected from exemplary embodiments of the present invention are directly or suggestively described in the following detailed description. That is, various effects expected from exemplary embodiments of the present invention will be described in the following detailed description.

BRIEF DESCRIPTION OF THE DRAWINGS

These and/or other aspects of the disclosure will become apparent and more readily appreciated from the following description of exemplary embodiments, taken in conjunction with the accompanying drawings of which:

FIG. 2 is an operational chart for respective control elements at respective shift stages in a planetary gear train according to an exemplary embodiment of the present invention.

DESCRIPTION OF SYMBOLS

Figure 1:
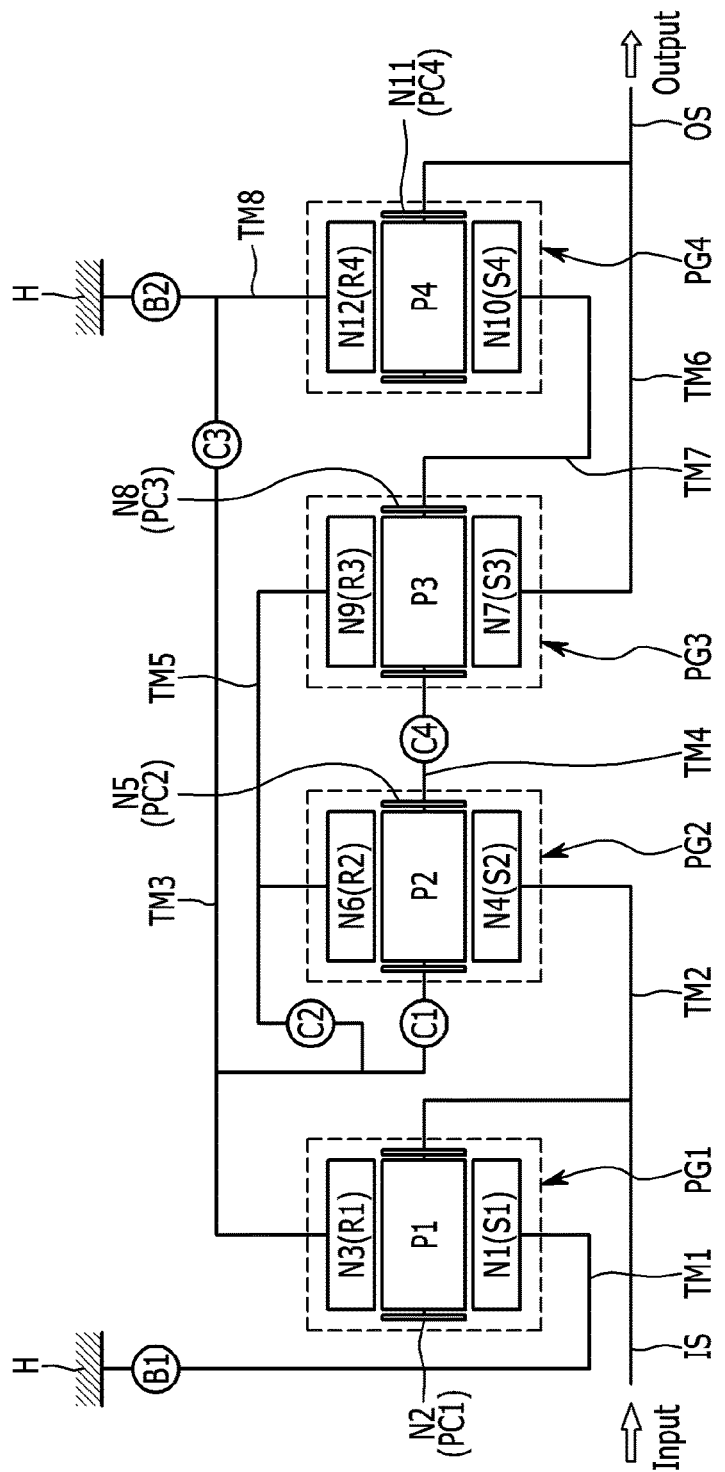
FIG. 1 is a schematic diagram of a planetary gear train according to an exemplary embodiment of the present invention.

B1,B2 . . . first, second brakes
C1,C2,C3,C4 . . . first, second, third, and fourth clutches
PG1,PG2,PG3,PG4 . . . first, second, third, and fourth planetary gear sets
S1,S2,S3,S4 . . . first, second, third, fourth sun gears
PC1,PC2,PC3,PC4 . . . first, second, third, and fourth planet carriers
R1,R2,R3,R4 . . . first, second, third, and fourth ring gears
IS . . . input shaft
OS . . . output shaft
TM1,TM2,TM3,TM4,TM5,TM6,TM7,TM8 . . . first, second, third, fourth, fifth, sixth, seventh, and eighth shafts

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an exemplary embodiment of the present invention will be described in detail with reference to drawings. The drawings and description are to be regarded as illustrative in nature and not restrictive, and like reference numerals designate like elements throughout the specification. In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention. Referring to FIG. 1, a planetary gear train according to an exemplary embodiment of the present invention may include first, second, third, and fourth planetary gear sets PG1, PG2, PG3, and PG4 arranged on a same axis, an input shaft IS, an output shaft OS, eight shafts TM1 to TM8 that interconnect rotational elements of the first, second, third, and fourth planetary gear sets PG1, PG2, PG3, and PG4, four clutches C1 to C4 and two brakes B1 and B2 as control elements, and a transmission housing H.

In particular, torque input from the input shaft IS may be shifted by cooperative operation of the first, second, third, and fourth planetary gear sets PG1, PG2, PG3, and PG4, and then may be output through the output shaft OS. The simplified planetary gear sets may be arranged in the order of first, first, second, third and fourth planetary gear sets PG1, PG2, PG3 and PG4, from an engine side. The input shaft IS is an input member and the torque from a crankshaft of an engine, after being torque-converted through a torque converter, may be input into the input shaft IS. The output shaft OS is an output member, and may be arranged on a same axis with the input shaft IS, and may be configured to deliver a shifted torque to a drive shaft through a differential apparatus.

The first planetary gear set PG1 is a double pinion planetary gear set, and may include a first sun gear S1, a first planet carrier PC1 that supports a first pinion P1 externally engaged with the first sun gear S1, and a first ring gear R1 internally engaged with the first pinion P1. The first sun gear S1 may operate as a first rotational element N1, the first planet carrier PC1 may operate as a second rotational element N2, and the first ring gear R1 may operate as a third rotational element N3.

The second planetary gear set PG2 is a single pinion planetary gear set, and may include a second sun gear S2, a second planet carrier PC2 that supports a second pinion P2 externally engaged with the second sun gear S2, and a second ring gear R2 internally engaged with the second pinion P2. The second sun gear S2 may operate as a fourth rotational element N4, the second planet carrier PC2 may operate as a fifth rotational element N5, and the second ring gear R2 may operate as a sixth rotational element N6.

The third planetary gear set PG3 is a single pinion planetary gear set, and may include a third sun gear S3, a third planet carrier PC3 that supports a third pinion P3 externally engaged with the third sun gear S3, and a third ring gear R3 internally engaged with the third pinion P3. The third sun gear S3 may operate as a seventh rotational element N7, the third planet carrier PC3 may operate as an eighth rotational element N8, and the third ring gear R3 may operate as a ninth rotational element N9.

The fourth planetary gear set PG4 is a single pinion planetary gear set, and may include a fourth sun gear S4, a fourth planet carrier PC4 that supports a fourth pinion P4 externally engaged with the fourth sun gear S4, and a fourth ring gear R4 internally engaged with the fourth pinion P4. The fourth sun gear S4 may operate as a tenth rotational element N10, the fourth planet carrier PC4 may operate as a eleventh rotational element N11, and the fourth ring gear R4 may operate as a twelfth rotational element N12.

In the arrangement of the first, second, third, and fourth planetary gear sets PG1, PG2, PG3, and PG4, the second rotational element N2 may be directly connected with the fourth rotational element N4, the sixth rotational element N6 may be directly connected with the ninth rotational element N9, the seventh rotational element N7 may be directly connected with the eleventh rotational element N11 and the eighth rotational element may be directly connected with the tenth rotational element N10 by eight shafts TM1 to TM8.

The eight shafts TM1 to TM8 may be arranged as follows. Each of the eight shafts TM1 to TM8 may be a rotational member that interconnects the input and output shafts and rotational elements of the planetary gear sets PG1, PG2, PG3, and PG4, or may be a fixed member fixed to the transmission housing H. The first shaft TM1 may be connected with the first rotational element N1 (first sun gear S1), and selectively connected with the transmission housing H, thereby operating as a selective fixed element. The second shaft TM2 may directly connect the second rotational element N2 (e.g., the first planet carrier PC1) and the fourth rotational element N4 (e.g., the second sun gear S2), and may be directly connected with the input shaft IS, thereby operating as an input element. The third shaft TM3 may be connected with the third rotational element N3 (e.g., first ring gear R1).

Additionally, the fourth shaft TM4 may be connected with the fifth rotational element N5 (e.g., second planet carrier PC2), and selectively connected with the third shaft TM3. The fifth shaft TM5 may be directly connected with the sixth rotational element N6 (e.g., second ring gear R2) and the ninth rotational element N9 (e.g., third ring gear R3), and selectively connected with the third shaft TM3. The sixth shaft TM6 may directly connect the seventh rotational element N7 (e.g., third sun gear S3) and the eleventh rotational element N11 (e.g., fourth planet carrier PC4), and may be directly connected with the output shaft OS, thereby operating as an output element.

The seventh shaft TM7 may be connected with the eighth rotational element N8 (e.g., third planet carrier PC3) and the tenth rotational element N10 (e.g., fourth sun gear S4), and may be selectively connected with the fourth shaft TM4. The eighth shaft TM8 may be connected with the twelfth rotational element N12 (e.g., fourth ring gear R4), selectively connected with the third shaft TM3, and selectively connected with the transmission housing H, thereby operating as a selective fixed element. The eight shafts TM1 to TM8, the input shaft IS, and the output shaft OS may be selectively interconnected with one another by control elements of four clutches C1, C2, C3, and C4. The shafts TM1 to TM8 may be selectively connected with the transmission housing H, by control elements of two brakes B1 and B2.

The four clutches C1 to C4 and the two brakes B1 and B2 may be arranged as follows. The first clutch C1 may be disposed between the third shaft TM3 and the fourth shaft TM4, to selectively connect the third shaft TM3 and the fourth shaft TM4 for power delivery. The second clutch C2 may be disposed between the third shaft TM3 and the fifth shaft TM5, to selectively connect the third shaft TM3 and the fifth shaft TM5 for power delivery. The third clutch C3 may be disposed between the third shaft TM3 and the eighth shaft TM8, to selectively connect the third shaft TM3 and the eighth shaft TM8 for power delivery. The fourth clutch C4 may be disposed between the fourth shaft TM4 and the seventh shaft TM7, to selectively connect the fourth shaft TM4 and the seventh shaft TM7 for power delivery.

Further, the first brake B1 may be disposed between the first shaft TM1 and the transmission housing H, and thus, the first shaft TM1 may be selectively connected with the transmission housing H and may operate as a fixed element. The second brake B2 may be disposed between the eighth shaft TM8 and the transmission housing H, and thus, the eighth shaft TM8 may be selectively connected with the transmission housing H and may operate as a fixed element. The control elements of the first, second, third, and fourth clutches C1, C2, C3, and C4 and the first brake B1 and the second brake B2 may be realized as multi-plate hydraulic pressure friction devices frictionally engaged by hydraulic pressure.

FIG. 2 is an operational chart for respective control elements at respective shift stages in a planetary gear train according to an exemplary embodiment of the present invention. Referring to FIG. 2, a planetary gear train according to an exemplary embodiment of the present invention realizes forward ten speeds and one reverse speed by operating three control elements among the first, second, third, and fourth clutches C1, C2, C3, and C4 and the first brake B1 and the second brake B2 at respective shift-stages.

In the forward first speed shift-stage D1, the first and second clutches C1 and C2 and the first and second brakes B1 and B2 may be operated simultaneously. As a result, the third shaft TM3 may be interconnected with the fourth shaft TM4 by the operation of the first clutch C1, and the third shaft TM3 may be interconnected with the fifth shaft TM5 by the operation of the second clutch C2. In particular, torque of the Input shaft IS may be input to the second shaft TM2, and the eighth shaft TM8 may operate as a fixed element by the operation of the second brake B2, thereby realizing the forward first speed and outputting a shifted torque through the output shaft OS connected with the sixth shaft TM6.

In the forward second speed shift-stage D2, the second clutch C2 and the first brake B1 and the second brake B2 may be operated simultaneously. As a result, the third shaft TM3 may be interconnected with the fifth shaft TM5 by the operation of the second clutch C2. In particular, torque of the Input shaft IS may be input to the second shaft TM2, and the first shaft TM1 and the eighth shaft TM8 may operate as fixed elements by the operation of the first brake B1 and the second brake B2, thereby realizing the forward second speed and outputting a shifted torque through the output shaft OS connected with the sixth shaft TM6.

In the forward third speed shift-stage D3, the first clutch C1 and the first brake B1 and the second brake B2 may be operated simultaneously. As a result, the third shaft TM3 may be interconnected with the fourth shaft TM4 by the operation of the first clutch C1. In particular, torque of the Input shaft IS may be input to the second shaft TM2, and the first shaft TM1 and the eighth shaft TM8 may operate as fixed elements by the operation of the first brake B1 and the second brake B2, thereby realizing the forward third speed and outputting a shifted torque through the output shaft OS connected with the sixth shaft TM6.

In the forward fourth speed shift-stage D4, the fourth clutch C4 and the first brake B1 and the second brake B2 may be operated simultaneously. As a result, the fourth shaft TM4 may be interconnected with the seventh shaft TM7 by the operation of the fourth clutch C4. In particular, torque of the Input shaft IS may be input to the second shaft TM2, and the first shaft TM1 and the eighth shaft TM8 may operate as fixed elements by the operation of the first brake B1 and the second brake B2, thereby realizing the forward fourth speed and outputting a shifted torque through the output shaft OS connected with the sixth shaft TM6.

In the forward fifth speed shift-stage D5, the first and fourth clutches C1 and C4 and the first brake B1 may be operated simultaneously. As a result, the third shaft TM3 may be interconnected with the fourth shaft TM4 by the operation of the first clutch C1, and the fourth shaft TM4 may be interconnected with the seventh shaft TM7 by the operation of the fourth clutch C4. In particular, torque of the Input shaft IS may be input to the second shaft TM2, and the first shaft TM1 may operate as a fixed element by the operation of the first brake B1, thereby realizing the forward fifth speed and outputting a shifted torque through the output shaft OS connected with the sixth shaft TM6.

In the forward sixth speed shift-stage D6, the second and fourth clutches C2 and C4 and the first brake B1 may be operated simultaneously. As a result, the third shaft TM3 may be interconnected with the fifth shaft TM5 by the operation of the second clutch C2, and the fourth shaft TM4 may be interconnected with the seventh shaft TM7 by the operation of the fourth clutch C4. In particular, torque of the Input shaft IS may be input to the second shaft TM2, and the first shaft TM1 may operate as a fixed element by the operation of the first brake B1, thereby realizing the forward sixth speed and outputting a shifted torque through the output shaft OS connected with the sixth shaft TM6.

In the forward seventh speed shift-stage D7, the second, third, and fourth clutches C2, C3, and C4 may be operated simultaneously. As a result, the third shaft TM3 may be interconnected with the fifth shaft TM5 by the operation of the second clutch C2, the third shaft TM3 may be interconnected with the eighth shaft TM8 by the operation of the third clutch C3, and the fourth shaft TM4 may be interconnected with the seventh shaft TM7 by the operation of the fourth clutch C4. In particular, total planetary gear sets PG1, PG2, PG3, and PG4 may be configured to rotate integrally, and a torque input through the second shaft TM2 may be output as input (e.g., output as the torque was input), thereby forming the forward seventh speed and outputting the input torque to the output shaft OS connected with the sixth shaft TM6.

In the forward eighth speed shift-stage D8, the third and fourth clutches C3 and C4 and the first brake B1 may be operated simultaneously. As a result, the third shaft TM3 may be interconnected with the eighth shaft TM8 by the operation of the third clutch C3, and the fourth shaft TM4 may be interconnected with the seventh shaft TM7 by the operation of the fourth clutch C4. In particular, torque of the Input shaft IS may be input to the second shaft TM2, and the first shaft TM1 may operate as a fixed element by the operation of the first brake B1, thereby realizing the forward eighth speed and outputting a shifted torque through the output shaft OS connected with the sixth shaft TM6.

In the forward ninth speed shift-stage D9, the second and third clutches C2 and C3 and the first brake B1 may be operated simultaneously. As a result, the third shaft TM3 may be interconnected with the fifth shaft TM5 by the operation of the second clutch C2, and the third shaft TM3 may be interconnected with the eighth shaft TM8 by the operation of the third clutch C3. In particular, torque of the Input shaft IS may be input to the second shaft TM2, and the first shaft TM1 may operate as a fixed element by the operation of the first brake B1, thereby realizing the forward ninth speed and outputting a shifted torque through the output shaft OS connected with the sixth shaft TM6.

In the forward tenth speed shift-stage D10, the first and third clutches C1 and C3 and the first brake B1 may be operated simultaneously. As a result, the third shaft TM3 may be interconnected with the fourth shaft TM4 by the operation of the first clutch C1, and the third shaft TM3 may be interconnected with the eighth shaft TM8 by the operation of the third clutch C3. In particular, torque of the Input shaft IS may be input to the second shaft TM2, and the first shaft TM1 may operate as a fixed element by the operation of the first brake B1, thereby realizing the forward tenth speed and outputting a shifted torque through the output shaft OS connected with the sixth shaft TM6.

In the reverse speed REV, the first and third clutches C1 and C3 and the second brake B2 may be operated simultaneously. As a result, the third shaft TM3 may be interconnected with the fourth shaft TM4 by the operation of the first clutch C1, and the third shaft TM3 may be interconnected with the eighth shaft TM8 by the operation of the third clutch C3. In particular, torque of the Input shaft IS may be input to the second shaft TM2, and the eighth shaft TM8 may operate as a fixed element by the operation of the first brake B1, thereby realizing the reverse speed and outputting a shifted torque through the output shaft OS connected with the sixth shaft TM6.

As described above, a planetary gear train according to an exemplary embodiment of the present invention may realize at least forward ten speeds and at least one reverse speed formed by operating four planetary gear sets PG1, PG2, PG3, and PG4 by operating the four clutches C1, C2, C3, and C4 and the two brakes B1 and B2. In addition, a planetary gear train according to an exemplary embodiment of the present invention may realize shift stages appropriate for rotation speed of an engine due to multi-stages of an automatic transmission and improve driving stability of a vehicle by utilizing a low rotation speed of an engine. The planetary gear train according to an exemplary embodiment of the present invention maximize engine driving efficiency by multi-stages of an automatic transmission, and may improve power delivery performance and fuel consumption.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A planetary gear train of an automatic transmission for a vehicle, comprising:
    an input shaft configured to receive an engine torque;
    an output shaft configured to output a shifted torque;
    a first planetary gear set having first, second, and third rotational elements;
    a second planetary gear set having fourth, fifth, and sixth rotational elements;
    a third planetary gear set having seventh, eighth, and ninth rotational elements;
    a fourth planetary gear set having tenth, eleventh, and twelfth rotational elements;
    a first shaft fixedly connected with the first rotational element;
    a second shaft that fixedly interconnects the second rotational element and the fourth rotational element such that the second and fourth rotational elements always rotate at a same speed and is fixedly connected with the input shaft;
    a third shaft fixedly connected with the third rotational element;
    a fourth shaft fixedly connected with the fifth rotational element and selectively connected with the third shaft;
    a fifth shaft that fixedly interconnects the sixth rotational element and the ninth rotational element such that the sixth and ninth rotational elements always rotate at a same speed and is selectively connected with the third shaft;

a sixth shaft that fixedly interconnects the seventh rotational element and the eleventh rotational element such that the seventh and eleventh rotational elements always rotate at a same speed and is fixedly connected with the output shaft;

a seventh shaft that fixedly interconnects the eighth rotational element and the tenth rotational element such that the eighth and tenth rotational elements always rotate at a same speed and is selectively connected with the fourth shaft; and an eighth shaft fixedly connected with the twelfth rotational element and selectively connected with the third shaft.

2. The planetary gear train of claim 1, wherein the first and eighth shafts are selectively connected with the transmission housing respectively.

3. The planetary gear train of claim 2, wherein:
a first clutch selectively connects the third shaft and the fourth shaft;
a second clutch selectively connects the third shaft and the fifth shaft;
a third clutch selectively connects the third shaft and the eighth shaft;
a fourth clutch selectively connects the fourth shaft and the seventh shaft;
a first brake selectively connects the first shaft and the transmission housing; and
a second brake selectively connects the eighth shaft and the transmission housing.

4. The planetary gear train of claim 1, wherein:
the first, second, and third rotational elements of the first planetary gear set are respectively a first sun gear, a first planet carrier, and a first ring gear of the first planetary gear set;
the fourth, fifth, and sixth rotational elements of the second planetary gear set are respectively a second sun gear, a second planet carrier, and a second ring gear of the second planetary gear set;
the seventh, eighth, and ninth rotational elements of the third planetary gear set are respectively a third sun gear, a third planet carrier, and a third ring gear of the third planetary gear set; and
the tenth, eleventh, and twelfth rotational elements of the fourth planetary gear set are respectively a fourth sun gear, a fourth planet carrier, and a fourth ring gear of the fourth planetary gear set.

5. A planetary gear train of an automatic transmission for a vehicle, comprising:
an input shaft configured to receive an engine torque;
output shaft configured to output a shifted torque;
a first planetary gear set having first, second, and third rotational elements;
a second planetary gear set having fourth, fifth, and sixth rotational elements;
a third planetary gear set having seventh, eighth, and ninth rotational elements; and
a fourth planetary gear set having tenth, eleventh, and twelfth rotational elements,
wherein the input shaft is fixedly connected with the second rotational element,
wherein the output shaft is fixedly connected with the eleventh rotational element,
wherein the second rotational element is fixedly connected with the fourth rotational element,
wherein the third rotational element is selectively connected with the fifth, sixth, and twelfth rotational elements, respectively, such that the third and fifth rotational elements rotate at a same speed when selective connection of the third and fifth rotational elements is activated, the third and sixth rotational elements rotate at a same speed when selective connection of the third and sixth rotational elements is activated, and the third and twelfth rotational elements rotate at a same speed when selective connection of the third and twelfth rotational elements is activated,
wherein the sixth rotational element is fixedly connected with the ninth rotational element,
wherein the seventh rotational element is fixedly connected with the eleventh rotational element, and
wherein the eighth rotational element is fixedly connected with the tenth rotational element and selectively connected with the fifth rotational element, such that the eighth and fifth rotational elements rotate at a same speed when selective connection between the eighth and fifth rotational elements is activated.

6. The planetary gear train of claim 5, wherein the first rotational element and the twelfth rotational element are selectively connected with the transmission housing respectively.

7. The planetary gear train of claim 6, further comprising:
a first clutch selectively connecting the third rotational element and the fifth rotational element;
a second clutch selectively connecting the third rotational element and the sixth rotational element;
a third clutch selectively connecting the third rotational element and the twelfth rotational element;
a fourth clutch selectively connecting the sixth rotational element and the ninth rotational element;
a first brake selectively connecting the first rotational element and the transmission housing; and
a second brake selectively connecting the twelfth rotational element and the transmission housing.

8. The planetary gear train of claim 5, wherein:
the first, second, and third rotational elements of the first planetary gear set are respectively a first sun gear, a first planet carrier, and a first ring gear of the first planetary gear set;
the fourth, fifth, and sixth rotational elements of the second planetary gear set are respectively a second sun gear, a second planet carrier, and a second ring gear of the second planetary gear set;
the seventh, eighth, and ninth rotational elements of the third planetary gear set are a third sun gear, a third planet carrier, and a third ring gear of the third planetary gear set; and
the tenth, eleventh, and twelfth rotational elements of the fourth planetary gear set are respectively a fourth sun gear, a fourth planet carrier, and a fourth ring gear of the fourth planetary gear set.

* * * * *